United States Patent Office 2,777,858
Patented Jan. 15, 1957

2,777,858
DIAMINO COMPOUNDS AND PROCESS FOR THE PRODUCTION THEREOF

Emil Girod, Riehen, near Basel, and Franz Häfliger, Basel, Switzerland, assignors, by mesne assignments, to Geigy Chemical Corporation, New York, N. Y., a corporation of Delaware No Drawing. Application December 6, 1951,
Serial No. 260,312

Claims priority, application Switzerland
December 12, 1950

6 Claims. (Cl. 260—313)

The present invention relates to diquaternary diammonium compounds derived from ditertiary amines of the general formula (Am)N—(CH$_2$)$_m$—S—(CH$_2$)$_n$—S—(CH$_2$)$_m$—N(Am)

and corresponding to the following general formula:

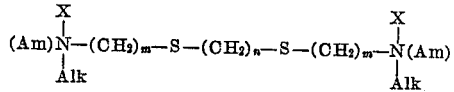

In these and all the following formulae

N(Am) represents lower dialkyl amino radicals or also alkylene imino radicals with 5-6 ring members,
Alk represents lower alkyl radicals,
X represents monovalent anions such as, e. g. halogen hydracids and alkyl sulphuric acids, and
$m$ is an integer from 2 to 3 and $n$ is an integer from 10 to 12.

By lower dialkylamino radicals are meant especially those with alkyl groups having from 1-4 carbon atoms. The piperidino- and pyrrolidino radicals, etc. particularly come into question as alkylene imino radicals with 5-6 ring members. In regard to their influence on the chemical and pharmacological properties of the end products they are generally equivalent to the lower dialkylamino radicals.

Price and Roberts (J. org. Chem. 12, 264-268 (1947)) tested the activity against malaria protozoa of 1.2-di-(2'-diethylaminoethyl-mercapto)-ethane and 1.2-di-(2'-dibutylamino ethyl mercapto)-ethane produced by reacting 1.2-di-(2'-chlorethyl mercapto)-ethane with diethyl-amine or dibutylamine. These bases had only a weak effect.

It has now been found that the new compounds defined above have a very interesting pharmacological action in another direction, e. g. on the tonus of the muscles.

The ditertiary amines of the general formula given above can be produced in two different but related ways.
Firstly, an alkane dithiole of the general formula:

HS—(CH$_2$)$_n$—SH or a salt thereof can be reacted with 2 mols of a tertiary aminoalkyl halide of the general formula:

(Am)N—(CH$_2$)$_m$—Hal

In this case Hal represents chlorine, bromine or iodine.
They can also be produced by reacting an alkane dihalide of the general formula:

Hal—(CH$_2$)$_n$—Hal with 2 mols of tertiary aminoalkane thioles of the general formula:

(Am)N—(CH$_2$)$_m$—SH or with salts thereof.

In both cases it is advantageous to perform the reaction in the presence of a solvent and a base which binds the hydrogen halide which is split off. It is also advantageous to first convert the mercaptan into a salt by means of a base. Suitable bases are, e. g. sodium amide, lithium amide, sodium ethylate, sodium hydroxide and potassium hydroxide. When using alkali amides, neutral solvents and those having no hydroxy groups are suitable such as diethyl ether, dibutyl ether, dioxane, benzene, toluene, xylenes and paraffin hydrocarbons. In addition to these, alcohols such as ethanol and butanol can be used when working with alcoholates and also water when using alkali hydroxides. In general, the reactions taken place at moderate temperatures, i. e. between 0 and 150° C.

To produce compounds with two different tertiary aminoalkyl groups, the reaction may proceed in steps by reacting one mol of an alkane dithiole of the general formula given above first with one mol of a tertiary aminoalkyl halide and then with one mol of a different tertiary aminoalkyl halide. Another process is the reaction of one mol of a dihalogen alkane with one mol of a tertiary aminoalkane thiol and then with one mol of a different aminoalkane thiol.

Any tertiary aminoalkyl mercaptans corresponding to the formula therefor given above can be used as starting materials. As examples may be listed: 2-dimethyl-amino-ethylmercaptan, 2-diethylamino-ethylmercaptan, 2 - (2'.5' - dimethyl - pyrrolidino) - ethylmercaptan, 3-(2'-methylpiperidino)-propylmercaptan, and 3-methyl-ethylamino - propylmercaptan. These mercapto compounds can be reacted with any dihalogen alkanes corresponding to the formula therefor given above. As examples may be listed: 1.10-dibromo-decane, 1.11-dibromo-undecane, and 1.12-dibromo-dodecane. On the other hand, any tertiary aminoalkyl halide which corresponds to the formula therefor given above, can be reacted with an appropriate alkane dithiole. As examples may be listed: 2-dimethylamino-ethyl chloride, 2-(methyl-ethyl-amino)-ethyl chloride, and 2-dipropylamino-ethyl chloride.

The pure bases produced according to this invention are generally in the form of colorless or light colored oils. They form salts with inorganic or organic acids. Some of the bases do not decompose when distilled in the vacuum and so can be purified; however, the higher molecular bases such as 1.10-di-(2'-diethylamino ethyl mercapto)-decane change when distilled under a pressure of about 0.1 mm. Because of their basic properties these compounds should be separated from any neutral or acid accompanying substances and freed from volatile bases by partial distillation in the vacuum.

The raw products so obtained are sometimes rather strongly colored but are pure enough, however, for many purposes. If desired they may be purified by filtration through absorption agents such as charcoal, fuller's earth, etc., by chromatography or by conversion into salts which can form crystals.

A few examples of ditertiary diamines intermediate products produced according to the invention are:

(CH$_2$)$_2$—N(CH$_3$)$_2$ (B. P.$_{0.1}$ 191–193°
hydrobromide: M. P. 201–203°)

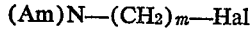
(CH$_2$)$_2$—N(CH$_3$)C$_4$H$_9$

N(C$_2$H$_5$)$_2$ (hydrobromide M. P. 138–139°)

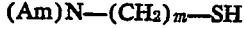

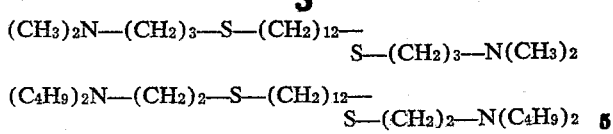

To convert these compounds into diquaternary diammonium compounds of the formula given at the beginning, the ditertiary diamines are reacted with about 2 mols of alkylating agents of the general formula Alk—X Methyl bromide, methyl iodide, dimethyl sulphate, ethyl bromide, ethyl iodide, propyl bromide, allyl bromide, butyl bromide and hexyl iodide are examples of such alkylating agents. If necessary, the reaction is performed in a closed vessel in the presence or absence of solvents. Either sufficient heat is generated to complete the reaction or the components can be gently heated to temperatures not exceeding about 100° C.

As the pharmacological activity of the slats according to this invention depend chiefly on the cation, the type of anion is of lesser importance for the purpose of this invention. Only salts of such inorganic or organic acids should be used for therapeutical purposes which are not in themselves strongly toxic and so do not cause pharmacological side effects. In other respects, the choice of anion depends on various other factors such as cost of acid or of alkylating agent, facility of reaction, capability to form crystals (possibility of purifying) and water solubility of the products. The most suitable solution is easy to find from case to case by a few tests. The anion is an iodine ion in the greater number of the quaternary salts described below because the alkyl iodide is particularly easy to add to the tertiary bases, and because the products are often capable of forming crystals and at the same time are soluble in water. The bromides have the same advantages and in addition are cheaper. Apart from the addition of alkyl chlorides, dialkyl sulphates and such like, salts with other anions can also be prepared by a double reaction by methods known per se from the quaternary salts obtained by direct addition (e. g. sulphates from iodides and silver sulphate; Reinecke's salts from bromides and Reinecke's ammonium salt).

The diquaternary salts are almost colourless compounds which crystallise or sometimes they are in the form of yellow viscous oils. Particularly organic solvents or suitable mixtures thereof such as mixtures from those which generally dissolve well like alcohols with those which do not dissolve so well such as acetone or ethyl acetate or those which do not dissolve well such as ether or benzene are suitable for the formation of crystals. In general, these salts dissolve well in water with a practically neutral reaction.

Of the diquaternary diammonium compounds derived from polymethylene dithioles with 10 to 12 carbon atoms, the decamethylene dithiole derivates are particularly interesting in view of their muscle-relaxing activity. The salt of, for instance 1.10-bis-(2'-triethyl ammonium ethyl thio)-decane has a strong activity similar to that of curare on the rat and rabbit as well as a considerable spasmolytic action on the isolated rabbit intestine.

The following compounds are given as examples of diquaternary ammonium salts:

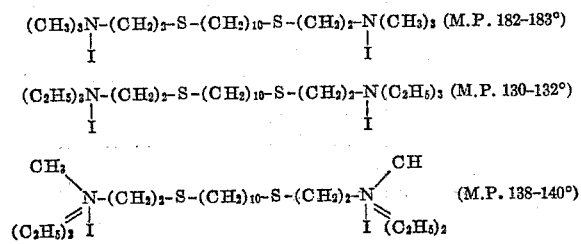

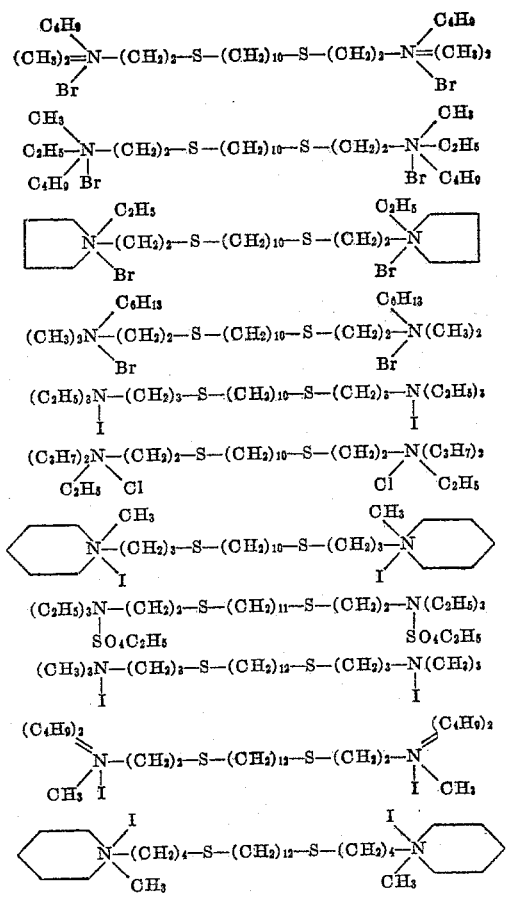

The following examples serve to illustrate the invention further. Where not otherwise stated, parts are always given as parts by weight in grammes and the relationship of parts by weight to parts by volume is that of grammes to cubic centimetres. The temperatures are given in degrees Centigrade.

*Example 1*

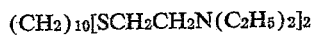

A very fine suspension of 10.5 parts of sodium amide in abs. toluene is slowly added to 100 parts by volume of abs. toluene, 30 parts of 1.10-dibromodecane and 30 parts of diethylamino ethyl mercaptan in a nitrogen atmosphere at 40–50°. On completion of the addition, the whole is stirred for 2 hours at 40–50° and then boiled for 2 hours under reflux. After cooling, sufficient 2n hydrochloric acid is stirred in to give the solution an acid reaction to congo red, the two layers are separated and the hydrochloric acid solution which contains the base is washed with ether. The base is then freed by the addition of 30% caustic soda lye. The product is isolated by ethering out, washing of the ether solution with water, drying with potash and distilling off the ether. Volatile by-products are removed as well as possible from the raw product by heating to 80–90° in a high vacuum. Because of possible decomposition, the 1.10-bis-(2'-diethylamino ethyl mercapto)-decane should not be distilled. If desired, it can be made lighter, however, by treatment with activated charcoal and filtration.

*Example 2*

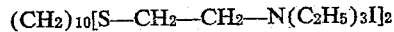

8.09 parts of 1.10-bis-(2'-diethylamino ethyl mercapto)-decane in 70 parts of dry acetone are heated to 50–60° with 3.4 parts by volume of ethyl iodide for 14 hours. After cooling, the product is filtered off by suction and, if desired, recrystallised from acetone with the addition of a little abs. methanol. M. P. 130–132°.

Example 3

(CH₂)₁₀[SCH₂CH₂CH₂N(C₂H₅)₂]₂·2HBr 30.0 parts of 1.10-dibromodecane and 35.0 parts of 3-diethylamino propyl mercaptan are reacted as described in Example 1, by means of 10.5 parts of sodium amide in toluene. On stirring with diluted hydrochloric acid (or hydrogen bromide) and cooling, the greater part of the hydrobromide of 1.10-bis-(3'-diethylamino propyl mercapto)-decane crystallises out. It is drawn off by suction and, if desired, purified by recrystallisation from abs. methanol+butanone. M. P. 138–139°.

Example 4

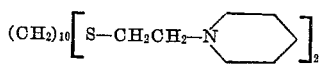

10.3 parts of 1.10-decane dithiole are dissolved in 53 parts by volume of 50% caustic soda lye in a nitrogen atmosphere and then 28 parts of 2-piperidino ethyl chloride hydrochloride are added in portions to the solution at 60° still in a nitrogen atmosphere. Thereafter the whole is stirred for 4 hours at 60° and for 2 hours at 100°. On cooling, the mixture is diluted with a little water, it is ethered out and the ether solution is washed with a little water. The bases are isolated by stirred with acid, etc., as described in Example 1. The raw base can be purified by way of the oxalate as follows:

15.7 parts of the raw product are dissolved in a hot solution of 10 parts of oxalic acid (+2H₂O) in 125 parts by volume of water. On cooling, the acid oxalate of 1.10 - bis - (2' - piperidino ethyl mercapto) - decane precipitates from the clear solution as a thick paste. It is drawn off by suction, washed with saturated aqueous oxalic acid solution, then with a little ice cold water and, if necessary, it can be recrystallised to complete purity from water or alcohol. M. P. 196–198° on decomposition.

On dissolving in hot water and adding conc. caustic soda lye to give an alkaline reaction, the pure 1.10-bis-(2'-piperidino ethyl mercapto) - decane is precipitated and can be isolated by ethering out. It can be converted in the usual way into other salts, e. g. the hydrochloride, the citrate or ethane disulphonate or into quaternary salts e. g. into the metho-iodide (M. P. 170° from water), the ethobromide or methyl methosulphate.

The other tertiary and quaternary compounds listed in the description can also be prepared according to the processes described in the above examples. Whenever it is possible to characterise the compounds by giving the melting point or boiling point, this has been done.

What we claim is:

1. A diammonium compound of the formula

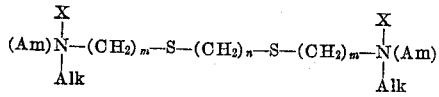

wherein (Am)N represents a member selected from the group consisting of a lower dialkylamino radical and a cyclic alkylene imino radical with 5 to 6 ring members, Alk represents a lower alkyl group, and X is a monovalent anion selected from the group consisting of a halogen of a molecular weight of at least 35 and a lower monoalkylsulfate radical with 1 to 2 carbon atoms, $m$ is an integer from 2 to 3 inclusive, and $n$ is an integer from 10 to 12 inclusive.

2. The diamino compound of the formula:

(CH₂)₁₀[S—CH₂CH₂CH₂—N(C₂H₅)₃I]₂

3. The diamino compound of the formula:

(CH₂)₁₀[S—CH₂CH₂—N(CH₃)₂C₄H₉Br]₂

4. The diamino compound of the formula:

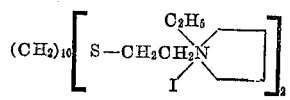

5. The diamino compound of the formula:

(CH)₂)₁₀[S—CH₂CH₂—N(C₂H₅)₃I]₂

6. A diamino compound of the formula

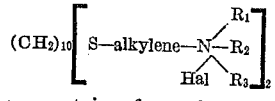

wherein alkylene contains from 2 to 3 carbon atoms, Hal is halogen of a molecular weight of at least 35, each of R₁, R₂ and R₃ is lower alkyl, and R₂ and R₃ taken jointly with the N atom form a pyrrolidine radical.

References Cited in the file of this patent

UNITED STATES PATENTS

| | | |
|---|---|---|
| 2,105,845 | Reppe et al. | Jan. 18, 1938 |
| 2,648,710 | Morrison et al. | Aug. 11, 1953 |
| 2,659,756 | Hafliger et al. | Nov. 17, 1953 |
| 2,683,147 | Girod | July 6, 1954 |

OTHER REFERENCES

Walker: JCS (1950) pp. 193–97.
Bovet: Annals, New York Acad. of Sciences, vol. 54, art. 3, Oct. 30, 1951, p. 425.
J. Org. Chem., vol. 20, pp. 50–59 (1955).
Price et al.: J. Org. Chem., vol. 12, pp. 264–68 (1947).